United States Patent
Madej

(10) Patent No.: US 7,677,457 B2
(45) Date of Patent: Mar. 16, 2010

(54) SYSTEM AND METHOD FOR DECODING A BARCODE

(75) Inventor: Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 777 days.

(21) Appl. No.: 11/287,914

(22) Filed: Nov. 28, 2005

(65) Prior Publication Data

US 2007/0119938 A1 May 31, 2007

(51) Int. Cl.
*G06K 5/04* (2006.01)

(52) U.S. Cl. .......................... 235/462.08; 235/462.16; 235/462.19; 235/462.27; 235/462.01; 235/462.09; 235/462.31

(58) Field of Classification Search ............ 235/462.16, 235/462.19, 462.27, 462.31
See application file for complete search history.

(56) References Cited

U.S. PATENT DOCUMENTS 6,098,883 A * 8/2000 Zocca et al. ............ 235/462.27
2002/0084327 A1 * 7/2002 Ehrhart et al. ............... 235/454

* cited by examiner

*Primary Examiner*—Michael G Lee
*Assistant Examiner*—Kristy A Haupt

(57) ABSTRACT

Described is a method and system for barcode decoding. The method comprises receiving an input signal corresponding to a reflection of light from a bar code. The input signal is divided into a predetermined number of segments. Each segment includes a plurality of samples. Each of the segments is represented using at least one of the samples therefrom. At least one sample from each segment is analyzed to determine a location the bar code within the input signal.

22 Claims, 6 Drawing Sheets

Fig. 3 neanncare proviuer iu kiiuw wnen you ngradient of CIALIS remains in your
n remain longer if you have problems
n other medications (see "Can other or the treatment of erectile dysfunction n and expand when a man is sexually
who has trouble getting or keeping an
n bothers him. CIALIS may help a man
' excited.

48 hours (2 days) or l
Take one CIALIS tablet
activity was improved at
The ability to have sexual
compared to a sugar pill.
should take CIALIS prior t
erection to happen with C
Do not change your dos
your dose or miss your d
Do not drink alcohol to
5 shots of whiskey). Whe
a headache or getting dizz
If you take too much CI?
What are the possible si
The most common side ... with CIALIS are headache, indigestion, back pain, muscle

nts, the ability to have sexual
en compared to a sugar pill.
urs after taking CIALIS when
ler this in deciding when you
al stimulation is needed for an
without meals.
loctor. Your doctor may lower ample, 5 glasses of wine or
ease your chances of getting
ering your blood pressure.
room right away.

101

103

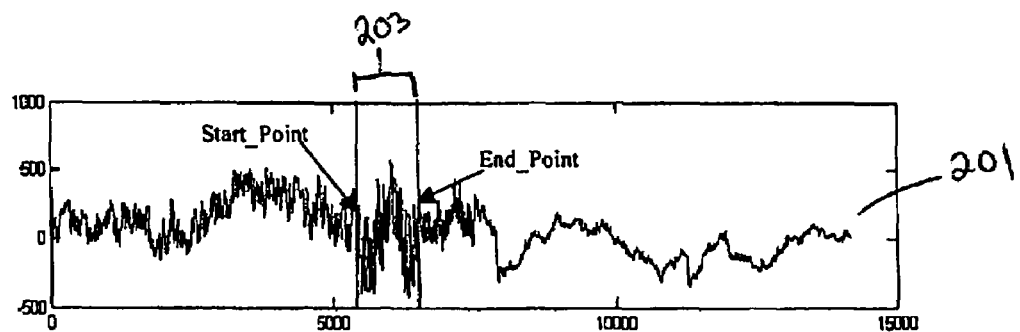
Fig. 4 Signal obtained by scanning image from Fig. 3; note actual bar code information is between Start-and-End points.
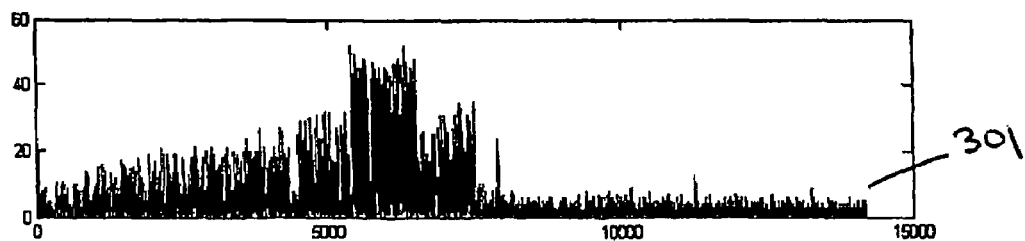
Fig. 5 Total variation (TV) of signal from Fig. 4
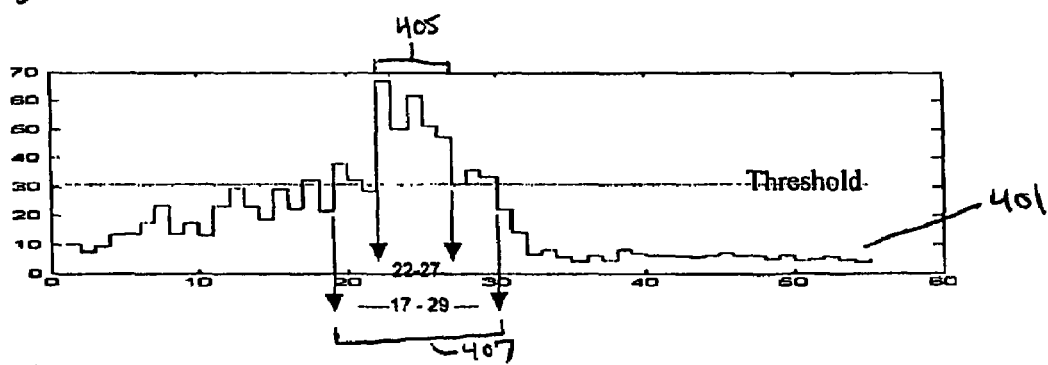
Fig. 6 Average Total Variation for N=60 sections of the signal.
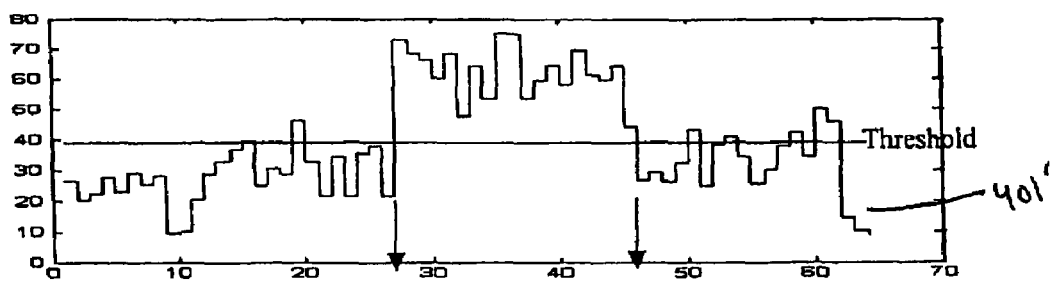
Fig. 7 Average Total Variation computed for the section of the signal from Fig. 6 represented by LS=(17-29); it can be understood as a zoom into a LS from Fig. 6

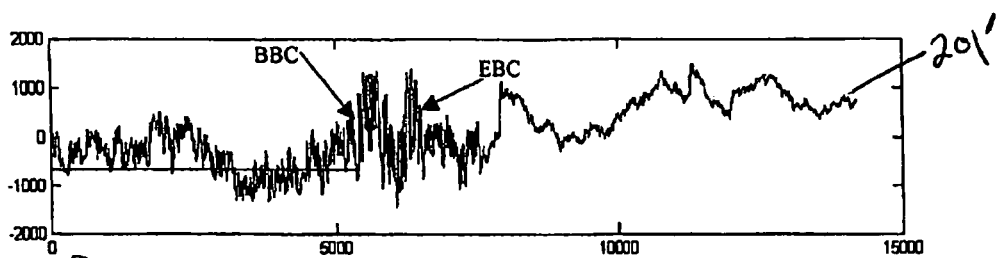
Fig. 8 Beginning (BBC) and End (EBC) of the bar code coordinates selected by a segmentation algorithm for a signal from Fig. 4; section between the BBC and EBC marked red.
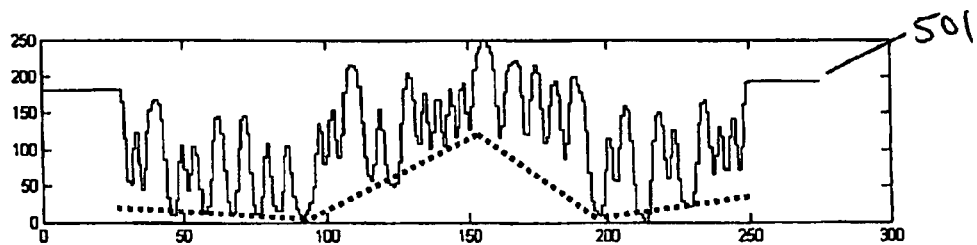
Fig. 9a)
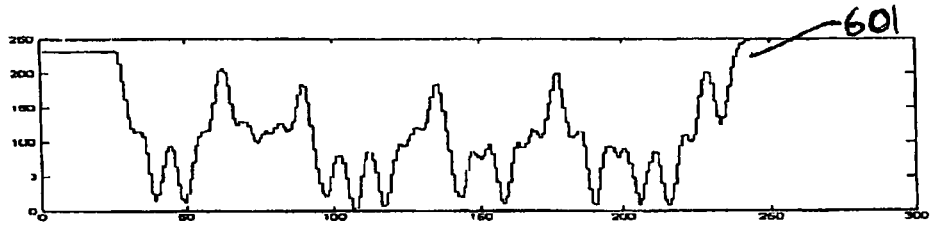
Fig. 9b)
9a) Luminance signal obtained from a differentiated signal        dotted red line represents the trend.
9b) Luminance signal obtained from a differentiated high blur signal        with removed trend.

SYSTEM AND METHOD FOR DECODING A BARCODE

BACKGROUND INFORMATION

Bar codes have become a part of everyday life. Most, if not all, consumer items have a bar code either on the item or attached to the item in some manner (e.g., a hang tag with a bar code). Organizations such as corporations and hospitals attach bar codes to physical property in order to keep track of the location of this physical property. Warehouses use bar codes on items, pallets, rows of racks, etc. to locate items and for inventory control. There are numerous other examples of bar codes being used for different purposes.

In each of these instances, it is not the act of attaching the bar code to the item that produces the favorable results, but the act of reading the bar code attached to the item and processing the information contained in the bar code, e.g., reading a bar code on a grocery item and charging the customer the correct amount for the grocery item. However, in many instances, the reading of the bar code is not an easy or straightforward task to accomplish. There may be instances where there is a problem with the bar code itself, e.g., the bar code image is not sufficiently sharp or has become damaged in some way, or instances where the reader causes a problem, e.g., the bar code reader cannot be placed close enough to the bar code to obtain a sharp image. If the bar code cannot be read, the myriad of benefits associated with bar coding items will not be realized.

SUMMARY OF THE INVENTION

The present invention relates to a method and system for barcode decoding. The method comprises receiving an input signal corresponding to a reflection of light from a bar code. The input signal is divided into a predetermined number of segments. Each segment includes a plurality of samples. Each of the segments is represented using at least one of the samples therefrom. At least one sample from each segment is analyzed to determine a location the bar code within the input signal.

The system comprises a bar code scanner and a CPU. The bar code scanner acquires information from a bar code and outputs a signal corresponding to a reflection of light from the bar code. The CPU receives the signal and divides the signal into a predetermined number of segments, each segment including a plurality of samples. The CPU represents each of the segments using at least one of the samples therefrom and analyzes the at least one sample from each segment to determine a location the bar code within the signal.

In another aspect, the present invention includes a bar code scanner comprising a scanning engine, a differentiator and an integrator. The scanning engine collects data from a bar code. The differentiator generates a differentiated signal from the collected data. The integrator integrates a portion of the differentiated signal corresponding the bar code.

BRIEF DESCRIPTION OF THE DRAWINGS

FIG. 3 shows an exemplary scan line over a bar code adjacent to text according to the present invention.

FIG. 4 shows an exemplary laser signal obtained by scanning the bar code shown in FIG. 3 according to the present invention.

FIG. 5 shows an exemplary total variation signal of the laser signal in FIG. 4 according to the present invention.

FIG. 6 shows an exemplary average total variation signal of the total variation signal in FIG. 5 according to the present invention.

FIG. 7 shows an exemplary portion of the average total variation signal of FIG. 6 according to the present invention.

FIG. 8 shows an exemplary luminance signal according to the present invention.

FIG. 9a shows an exemplary luminance signal with a trend according to the present invention.

FIG. 9b shows an exemplary de-trended luminance signal according to the present invention.

DETAILED DESCRIPTION

Figure 1:
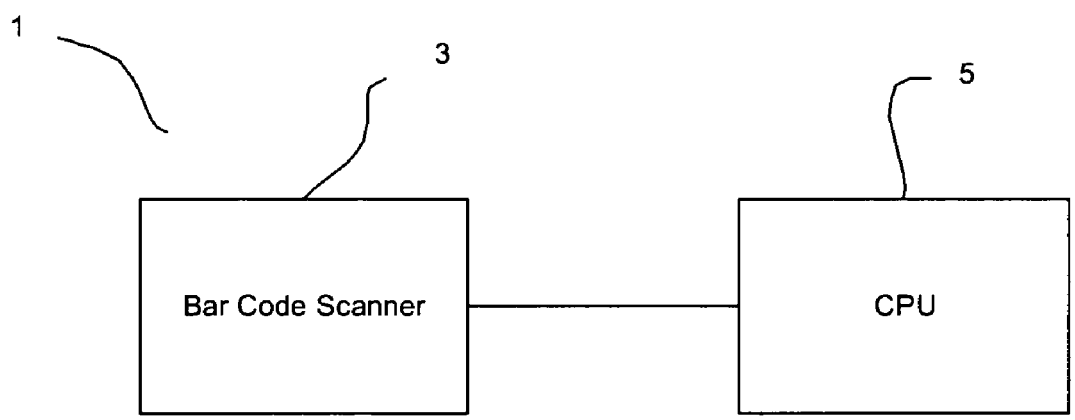
FIG. 1 shows an exemplary system for detecting and decoding a bar code.

The present invention may be further understood with reference to the following description and the appended drawings, wherein like elements are provided with the same reference numerals. The present invention discloses a system and method for decoding a barcode. The exemplary embodiments will be described with reference to a laser bar code scanner, e.g., a flying spot laser scanner. The scanner utilizes a digitally sampled waveform of a differentiated reflected laser light signal to generate a decodable bar code signal. A conventional flying-spot laser scanner differentiates a reflected laser light signal of a bar code prior to processing, registering and decoding. Differentiation, while providing some benefits in signal processing, greatly amplifies noise. On the other hand, registering a non-differentiated signal may allow for better decoding of noisy and blurred images, but would require many bits to represent a sample of the signal due to a high dynamic range. The present invention provides a representation of the signal which allows for efficient processing of noisy and/or blurred signals. The representation is also suitable for decoding by a high blur decoder, which is described in U.S. Pat. No. 6,328,213 entitled "Method of processing an analog electrical signal containing information representative of reflected light from coded indicia, wherein the electrical signal contains edge transitions", the entire disclosure of which is incorporated herein by reference.

FIG. 1 shows an exemplary system 1 for detecting and decoding a bar code. A bar code scanner 3 collects data from a bar code. A laser bar code scanner collects data points using a reflection of a laser beam off of the bar code. The bar code scanner 3 collects the data from the bar code (e.g., data points, image, etc) and may also perform some front end or pre-processing of the data. The bar code scanner 3 then sends either the raw data or the pre-processed data (in the case where the bar code scanner 3 includes front end processing capabilities) to a memory of a CPU 5. The CPU 5 includes a decoding engine which accesses the memory and completes the decoding of the bar code by processing the data forwarded by the bar code scanner 3 to extract the information contained in the bar code.

Figure 2:
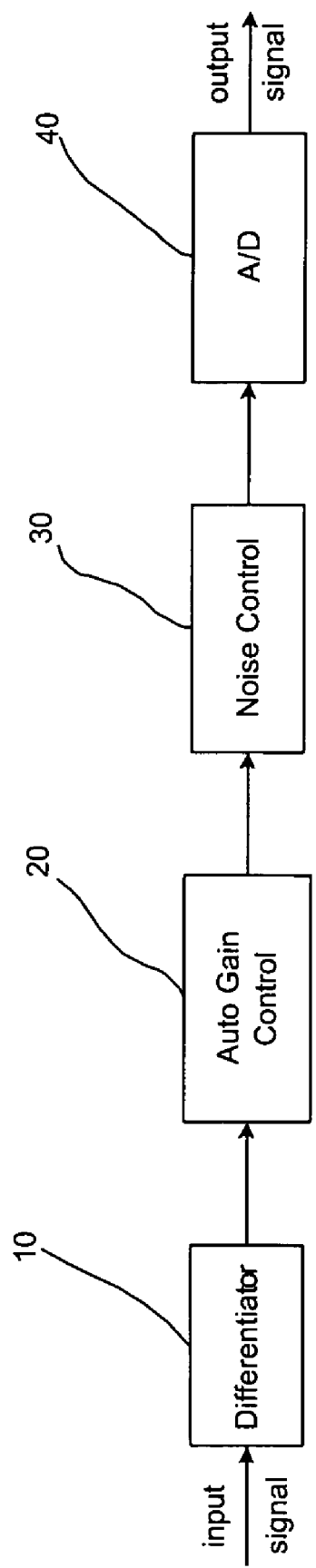
FIG. 2 shows a block diagram of exemplary front end processing components of a laser bar code scanner according to the present invention.

FIG. 2 shows a block diagram of exemplary front end processing components 10-40 of a laser bar code scanner. A bar code pattern scanned by the scanner 3 includes a series of bars and spaces. A typical laser bar code scanner generates several tens of thousands of data points per scan (e.g., 30,000 data points/scan) and makes multiple scans per second (e.g. 30 to 500 scans per second, with 100 scans being common for a hand held scanner). A reflectance pattern, i.e., inverse of the bar code pattern, is convoluted with the laser beam of the scanner 3 to yield a laser signal which is an input signal shown in FIG. 2.

The input signal (e.g., the laser signal) is input into a differentiator 10 to yield a differentiated signal which is an inverted first derivative of the input signal. The differentiated signal is input into an auto gain control ("AGC") element 20 and a noise control element 30. Those of skill in the art will understand that these elements 20, 30 are signal conditioning elements which condition the signal for further processing. Those of skill in the art will also understand that the elements 20, 30 may contain a variety of components used for signal processing, e.g., noise control element 30 may include a series of low pass and high pass filters to filter out noise in various bandwidths.

The conditioned signal is then input into an analog digitizer 40 which generates a digital sample of the differentiated signal. According to the present invention, the digital sample (e.g., approximately 6 bits) may adequately represent the differentiated signal when a predetermined sampling rate is used (e.g., a high sampling rate—30,000 data points/scan at 100 scans/second). The digital samples are an output signal which may be the signal transmitted to the memory of a CPU (e.g., CPU 5 of FIG. 1) for further decoding.

As is known in the art, direct registering of a luminance signal rather than the (differentiated) input signal may exhibit a high dynamic range due to, for example, ambient light in the scanning environment. That is, the ambient light may distort the reflectance pattern received by the scanner 3. The ambient light may also vary during a duration of the scan. For example, a flickering light in the scanning environment may cause the ambient light collected by the scanner 3 to vary over the duration of the scan (e.g., as the laser beam moves from left to right over a scan line) distorting portions of the input signal. A distance between the scanner 3 and the bar code 4 may further contribute to distortion of the input signal, because, as the distance increases, so does the likelihood that the ambient light will be collected by the scanner 3 along with the reflectance pattern.

A conventional laser scanner accounts for the high dynamic range of the input signal by using a differentiator. Alternatively, many bits, accounting for the high dynamic range, are utilized to generate a sample of the input signal. Conditioning and digitizing the input signal to acquire a decodable sample typically would require a high-end digitizer utilizing a significant amount of memory and a faster processor (e.g., more cycles). Also, the laser scanner would require a powerful processor running an advanced decoder to process the samples in real-time due to the high sampling rate. Few scanners, and, in particular, hand-held scanners, utilize a processor this powerful. The present invention produces a decodable signal while limiting the need for the high-end digitizer and the powerful processor.

FIG. 3 shows an exemplary bar code 101 which is surrounded by text. As is known in the art, a decoder utilized by the scanner 3 may be obstructed by objects (e.g., text) adjacent the bar code 101. Thus, the decoder may be prevented from detecting edges of the bar code 101 when analyzing the input signal. FIG. 3 also shows an exemplary scan line 103 which is generated when the laser beam is reflected from a rotating mirror in the scanner 3. The mirror rotates through a predetermined angular range to sweep the laser beam from left to right along the scan line 103 at a predetermined sampling rate. In the exemplary embodiment, the scanner 3 is configured to utilize a high sampling rate, because the distance between the scanner 3 and the bar code 101 is unknown at the outset of scanning. That is, those of skill in the art understand that a low sampling rate may be utilized when the bar code 101 is relatively close to the scanner 3. However, if the scanner 3 were configured with the low sampling rate at the outset of scanning and the bar code 101 is far from the scanner 3, the input signal may not have enough resolution to resolve the bar code elements and decode a symbol. Thus, the preferred embodiment acquires the input signal utilizing the high sampling rate.

Objects along the scan line 103, including the bar code 101, reflect the laser beam which the scanner 3 captures to generate the input signal. In ideal scanning conditions, the bar code 101, which is defined by a series of rapid contrast changes between spaces and bars, may be easily detectable within the input signal. However, as stated above, the ambient light, the sampling rate, low bar code contrast, graphical elements surrounding the bar code 101 and the distance between the scanner 3 and the bar code 101 may contribute to distortion of the input signal causing recognition and decoding of the bar code 101 to become more difficult.

FIG. 4 shows an exemplary input signal 201 generated by scanning an image (e.g., the text and the bar code 101 along the scan line 103) shown in FIG. 3. A start point and an end point of a bar code signal 203 have been labeled simply to show that the bar code signal 203 may be difficult to detect within the input signal 201. That is, the decoder of the scanner 3 may have difficulty detecting the bar code signal 203 because the rapid contrasts which are a signature of the bar code 100 are not readily apparent. This may be due to, for example, the text surrounding the bar code 101, the ambient light included in the input signal 201 or any other distortion caused by the scanning environment and/or signal processing. Rather than utilizing a significant amount of processing resources to digitize the input signal 201, the present invention utilizes a segmentation algorithm to locate the bar code signal 203 within the input signal 201.

FIG. 5 shows a total variation signal 301 generated by processing a total variation of the input signal 201 shown in FIG. 4. The total variation measures a maximum of an absolute rate of signal changes within the input signal 201. As shown in FIGS. 4 and 5, the location of the bar code signal 203 is more easily detectable in the total variation signal 301. In one embodiment, the entire input signal 201 is analyzed. In a preferred embodiment, the input signal 201 is divided into a predetermined number of segments N. The number of the segments N may be selected based on a number of samples contained in the input signal 201. For example, as shown in FIG. 4, the input signal 201 contains approximately 15,000 samples. As such, the number of the segments N may be approximately 60 (N=60). Those of skill in the art will understand that the number may be determined as a result of theoretical and/or operational data. For example, mathematical analysis and/or scanning feedback may determined that the number should be adjusted to process more efficiently the total variation of the input signal 201. When the input signal 201 is divided into the segments N, each segment includes approximately 256 samples (~15,000 samples / 60 segments).

An initial decimation of the total variation signal 301 further reduces a portion of the input signal 201 (e.g., number of samples) which will be processed. An initial decimation factor K is selected based on, for example, a signal sampling frequency so that selected values within each segment N are analyzed to determine the location of the bar code signal 203 within the input signal 201. In the exemplary embodiment, the factor K is selected as 16 (K=16) so that every $16^{th}$ ($K^{th}$) sample of the total variation signal 301 is analyzed. Thus, the portion of the input signal 201 processed to determine the location of the bar code signal 203 is reduced to approximately 7% (1/K when K=16) of the input signal 201, e.g., only the selected values.

The selected values are utilized to compute an average total variation signal 401 which is shown in FIG. 6. In the exemplary embodiment, every $16^{th}$ sample in each segment is summed and divided by a total number of the $16^{th}$ samples included in the segment. For example, if each segment N includes approximately 256 samples and the initial decimation factor K is 16, there would be 16 selected values (256/16) that are summed and then divided by 16 to yield an average total variation value (ATV). The ATVs for the 60 segments are plotted in FIG. 6. The average total variation signal 401 is analyzed to expose the location of the bar code signal 203.

A threshold value is utilized to filter the average total variation signal 401, distinguishing the bar code signal 203 from noise. That is, as shown in FIGS. 5 and 6, regions on one or both sides of the bar code signal 203 may include distortion, making it difficult to distinguish edges (i.e., left and right margins) of the bar code. Thus, the threshold value is computed so that the ATVs above the threshold value correspond to the bar code signal and the ATVs below correspond to noise. The threshold value may be computed as follows:

Threshold=mean($ATV$)+$k$*(max($ATV$)−min($ATV$))

where $k$=0.2

A threshold constant k is used to adjust a mean value of the ATVs. The threshold constant k may be selected based on theoretical and/or operational scanning results which would optimize the decoding of bar codes.

The average total variation signal 401 is analyzed to determine a longest sequence (LS) 405 of consecutive ATVs which are greater than the threshold value. As understood by those of skill in the art, the LS 405 may provide a general location of the bar code signal 203. However, as noted above, the edges of the bar code signal may be cut off if only the LS 405 is decoded. As shown in FIG. 6, the LS 405 is identified as extending from section 22 to section 27. Within the LS 405, a width of a narrow element (NE) may be estimated as a minimum distance between edges of the segments N. Those of skill in the art will understand that only a portion of the LS 405 need be analyzed to determine the NE.

To ensure that the LS 405 encompasses the edges of the bar code signal 203, an extended LS 407 is generated by merging the LS 405 with an adjacent section N and/or sequences of sections N which are above the threshold value. Extension of the LS 405 may take into account factors including, but not limited to, a width of the LS 405, a width of the adjacent segment(s) N, a width of a gap between the LS 405 and the adjacent segment(s) N, a mean value of the ATV in the adjacent segment(s) N, a mean value of the ATV in the gap, the NE, etc. Utilizing one or more of these factors, the a left side of the LS 405 is extended to the segment 17 and a right side of the LS 405 is extended to the segment 29. Thus, the extended LS 407 is approximately 12 segments wide spanning from the segments 17 to 29. In terms of samples, the extended LS 407 begins at approximately sample 4352 (17*256) and terminates at approximately sample 7424 (29*256).

The extended LS 407 may then be analyzed to determined whether it is an accurate estimation of the bar code signal 203. That is, further precision may be required when, for example, the bar code 101 encompasses a small percentage of the scan line 103. This may occur when the bar code 101 itself is small, when the scanner 3 utilizes a wide scan angle and/or the bar code 101 is at an end of the scanner's reading range (i.e., far from the scanner 3). An exemplary embodiment of logic to determine the accuracy of the extended LS 407 is as follows:

```
if (NE > threshold_1) and (extended_LS/N > threshold_2) or
(extended_LS/N > threshold_3)
    then
        extended LS is not accurate enough;
        Further precision required - reexecute segmentation and
        total variation beginning with the LS;
    Else
        extended LS is accurate
    end if
    where       threshold_1 = 40 (in samples)
                threshold_2 = 0.2
                threshold_3 = 0.3
```

The above-listed thresholds may be determined theoretically and/or operationally. For example, the thresholds may be initially configured for the above-listed values and adjusted based on scanning situations, scenarios and conditions.

If further precision is required, the segmentation algorithm and the total variation process are repeated. However, the previously computed LS may be used at the outset rather than the entire input signal 201. Also, the initial decimation factor K may be readjusted to, for example, max(1, NE/4), so that the average total variation signal 401' is more detailed, as shown in FIG. 7. Furthermore, the NE may be reestimated to improve the accuracy of the bar code signal locationing within the input signal 201.

If the extended LS 407 is determined to be accurate (either the original extended LS or a re-computed extended LS), the extended LS is analyzed to identify the left and right margins of the bar code. The left margin may be defined as a beginning-of-bar-code coordinate (BBC) which is a last zero crossing of a differentiated signal preceding the first strong positive edge (e.g., transition from a space to a bar). The right margin may be defined as an end-of-bar-code coordinate (EBC) which is a first zero crossing of a differentiated signal after the last strong negative edge (e.g., transition from a bar to a space). FIG. 8 shows an inverted input signal 201' with the BBC and the EBC defining the edges of the bar code signal 203. The inversion reverses an effect of an initial signal inversion effected by the differentiator 10 in the scanner front-end. The BBC and the EBC may be sample values which correspond to the left and right margins of the bar code, respectively. From the segmentation algorithm and the total variance process, the bar code signal 203 has been located within the inverted input signal 201', and the BBC and the EBC have been accurately defined.

A final decimation is applied to the inverted input signal 201' using a final decimation factor DF so that only a selected number of samples are analyzed. Based on the NE, the final decimation may be applied as follows:

$DF=NE/DPM$ where DPM is a minimum number of samples per narrowest element of the bar code that the decoder requires for decoding (e.g., a high blur decoder may be configured so that the DPM=2).

The final decimation factor DF is applied to a portion of the inverted input signal 201' between the BBC and the EBC so that every $DF^{th}$ sample therein is selected. In a preferred embodiment, the final decimation includes sub-sampling and low-pass filtering to prevent an aliasing error. However, as is known by those of skill in the art, the laser beam functions as a de facto low pass filter limiting the frequency of the luminance signal. Thus, the low-pass filtering may be bypassed in a high blur case. That is, in the case of blur, the laser beam is approximately 2×-4× wider than the narrow element of the bar code. Thus, if the final decimation factor DF is selected such that at least two samples represent the NE, then a fundamental frequency of the bar code is already attenuated by a predetermined attenuation level (e.g., −10 dB in the case of medium blur and up to −60 dB in the case of high blur). The laser beam acts as the low-pass filter and attenuates elements of high frequency farther than those of fundamental frequency, substantially reducing and/or eliminating the aliasing error. Those of skill in the art will understand that present invention reduces a number of computations which are traditionally required in decoding a differentiated signal.

The portion of the signal between the BBC and the EBC is then converted from a derivative domain to an un-differentiated luminance domain by an integrator. The input signal 201 is inverted generating the inverted input signal 201' as a result of the integration. The inversion reverses an effect of an initial signal inversion effected by the differentiator 10 in the scanner front-end. Those of skill in the art will understand that the entire input signal 201 may be integrated, but that may require more memory and CPU cycles than integrating only the portion between the BBC and the EBC. Because only the portion of the signal between the BBC and the EBC is converted to the luminance domain, the dynamic range of the portion is smaller than that of the entire input signal 201. Thus, fewer bits (e.g., approximately 8 bits) may be used to represent the integrated portion without losing signal resolution needed for further decoding. The integrator may use, for example, a running sum of samples to integrate the differentiated signal. Those of skill in the art understand that other methods of integration may also be utilized.

When the portion of the input signal 201 is converted from the derivative domain to the un-differentiated luminance domain, a luminance signal 501 may contain a trend 503, as shown in FIG. 9a. The trend 503 may be caused by distortion introduced by one or more of the front end processing components of the scanner (e.g., an amplifier), ambient light variances in the scanning environment (e.g., flickering light), ambient light variances over the scan line 103, field of view variations due to rotations of the scan mirror, etc. Those of skill in the art will understand that the segmentation algorithm described above may substantially reduce the trend 503, because only the portion of the signal between the BBC and the EBC was integrated.

Any remaining trend may be removed using a de-trending algorithm. In one exemplary embodiment, the de-trending algorithm is based on a minimization of a least square error of fitting to a signal of a second-degree curve or sequence of straight-line segments. Another exemplary de-trending algorithm is a non-linear de-trending based on properties of the bar code signal. A substantially or fully de-trended signal is then converted to a byte value scale in a range sufficient for decoding. FIG. 9(b) shows a de-trended signal 601 in a case of a high blur level. That is, the present invention may be implemented in cases of high and low blur levels.

The de-trended signal 501, 601 may then be easily decoded by a high blur decoder. The segmentation algorithm and the total variance of the input signal bypass the cost and processing power associated with digitizing noisy laser signals. Segmentation combined with integration and de-trending allows further use of the high blur decoder may extend a reading range of the scanner 3.

Figure 10:
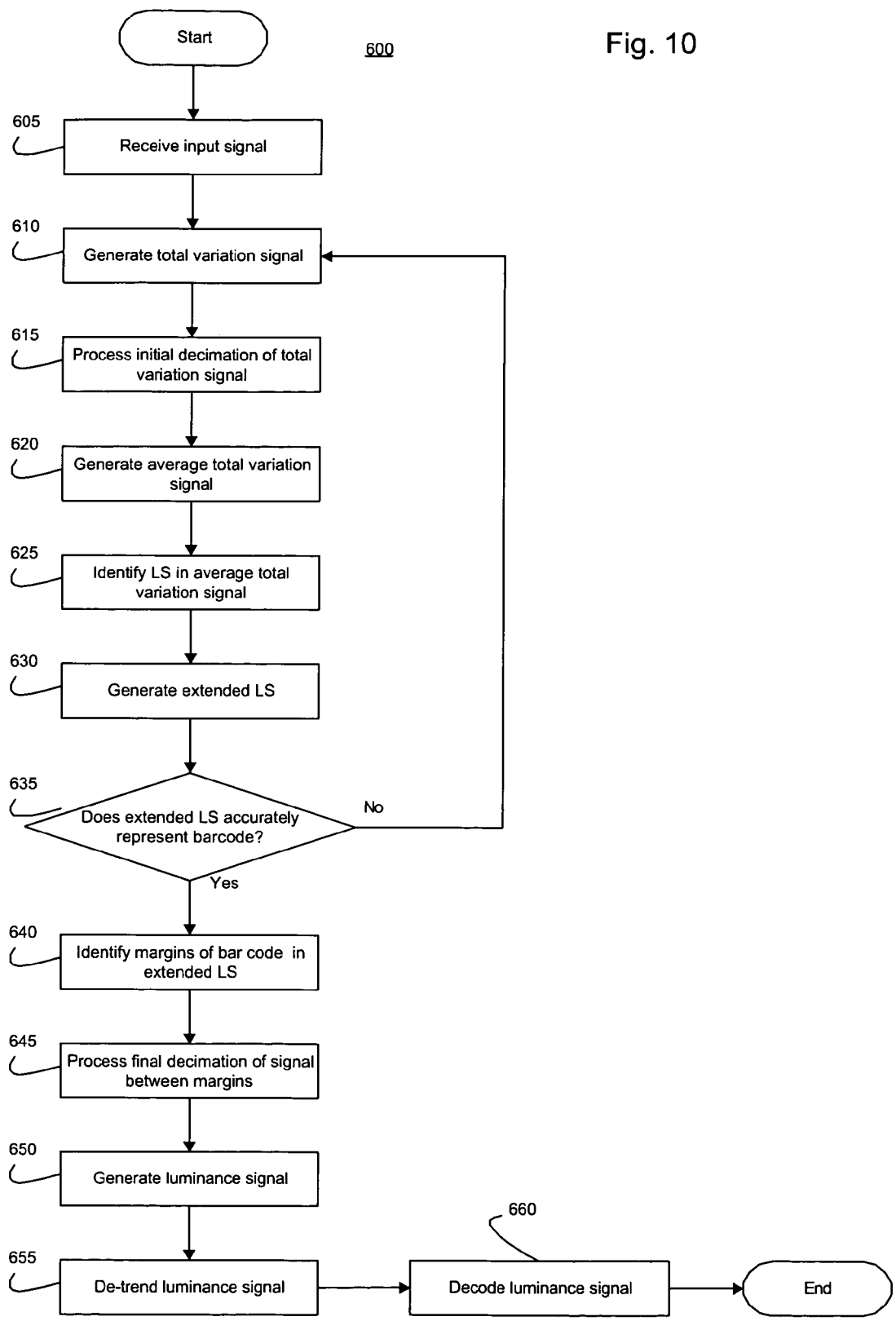
FIG. 10 shows an exemplary embodiment of a method according to the present invention.

FIG. 10 shows a method 600 for decoding a bar code according to the present invention. In step 605, the scanner 3 receives the input signal 201, e.g., the reflection of the laser beam from the bar code. The input signal 201 may then be input into the differentiator 10 and other signal conditioning elements. In step 610, the total variation signal 301 is generated by processing the total variation of the input signal 201. The total variation signal 301 may be a representation of the input signal 201 divided into the predetermined number of segments N. In step 615, the initial decimation of the total variation signal 301 is processed to generate a plurality of selected values (based on the initial decimation factor K). In step 620, the average total variation signal 401 is generated by averaging the selected values in each of the segments N and outputting the ATVs.

In step 625, the average total variation signal 401 is compared to the threshold value to generate the LS 405, i.e., longest sequence of consecutive ATVs greater than the threshold value. In step 630, the extended LS 407 is generated by merging the LS 405 with adjacent sequences of the ATVs which are greater than the threshold value. It is then determined (step 635) whether the extended LS 407 is an accurate representation of the bar code. If the extended LS 407 is not an accurate representation of the bar code, the process is repeated using the extended LS 407 instead of the a further input signal. That is, a total variation of the extended LS 407 is processed.

When the extended LS 407 accurately represents the bar code, the margins of the bar code are identified within the extended LS 407, as shown in step 640. The margins are used to identify the bar code in the input signal 201. In step 645, the final decimation of the portion of the input signal 201 between the margins is processed. In step 650, the luminance signal 501 is generated by integrating the portion of the input signal 201 between the margins. Optionally, the luminance signal 501 may be de-trended in step 655. In step 660, the luminance signal 501 is decoded.

The present invention has been described with the reference to the above exemplary embodiments. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
   receiving an input signal corresponding to a reflection of light from a bar code;
   dividing the input signal into a predetermined number of segments, each segment including a plurality of samples;
   selecting particular samples from the plurality of samples to generate an average sample for each segment;
   comparing the average samples to a threshold value;
   identifying a sequence of consecutive average samples greater than the threshold value; and
   determining a location of the bar code within the input signal based on the identified sequence.

2. The method according to claim 1, further comprising:
   generating the input signal at a predetermined sampling rate.

3. The method according to claim 2, wherein the sampling rate is at least approximately 30,000 data points per scan.

4. The method according to claim 1, wherein the dividing step further includes the following substep:
   processing a total variation of the input signal to generate the segments.

5. The method according to claim 1, further includes:
   selecting the particular samples at a first predetermined interval from the plurality of samples in each segment; and averaging the particular samples to generate an average sample for each segment.

6. The method according to claim 5, wherein the first predetermined interval is approximately every 16th sample.

7. The method according to claim 1, further comprising:
appending the sequence with at least one sample on each side thereof to generate an extended sequence.

8. The method according to claim 7, further comprising:
when the extended sequence represents the bar code, performing the following substeps:
determining margins of the bar code with the extended sequence;
identifying the margins in the input signal; and
decoding a portion of the input signal between the margins.

9. The method according to claim 8, wherein the decoding step further includes the following substeps:
selecting samples from the portion at a second predetermined interval;
converting the samples into a luminance signal; and
decoding the bar code using the luminance signal.

10. The method according to claim 9, wherein the second predetermined interval is a ratio of a width of a narrow element of the bar code to a minimum width required for decoding the narrow element.

11. The method according to claim 9, wherein the converting step further includes the following substep:
generating an integral of the samples to yield the luminance signal.

12. The method according to claim 9, wherein, prior to the decoding step, further comprising:
removing a trend from the luminance signal.

13. The method according to claim 9, wherein, the decoding step is performed using a high blur decoder.

14. A system, comprising:
a bar code scanner acquiring information from a bar code and outputting a signal corresponding to a reflection of light from the bar code; and
a central processing unit (CPU) receiving the signal and dividing the signal into a predetermined number of segments, each segment including a plurality of samples, the CPU selecting particular samples from the plurality of samples to generate an average sample for each segment and comparing the average samples greater than the threshold value and determining a location of the bar code within the input signal based on the identified sequence.

15. The system according to claim 14, wherein the bar code scanner is one of a laser bar code scanner and a flying spot laser bar code scanner.

16. The system according to claim 14, wherein the CPU selects the particular samples at a first predetermined interval from the plurality of samples in each segment and averages the particular samples to generate an average sample for each segment.

17. The system according to claim 16, wherein the first predetermined interval is approximately every 16th sample.

18. The system according to claim 14, wherein the CPU appends the sequence with at least one sample on each side thereof to generate an extended sequence.

19. The system according to claim 18, wherein, when the extended sequence represents the bar code, the CPU determines margins of the bar code within the extended sequence and identifies the margins in the input signal, the CPU decoding a portion of the input signal between the margins.

20. The system according to claim 19, wherein the CPU selects samples from the portion at a second predetermined interval and converts the samples into a luminance signal, the CPU decoding the bar code using the luminance signal.

21. The system according to claim 20, wherein the second predetermined interval is a ratio of a width of a narrow element of the bar code to a minimum width required for decoding the narrow element.

22. The system according to claim 21, wherein the CPU removes a trend from the luminance signal prior to decoding the bar code.

* * * * *

UNITED STATES PATENT AND TRADEMARK OFFICE
CERTIFICATE OF CORRECTION

| | | |
|---|---|---|
| PATENT NO. | : 7,677,457 B2 | Page 1 of 1 |
| APPLICATION NO. | : 11/287914 | |
| DATED | : March 16, 2010 | |
| INVENTOR(S) | : Madej | |

It is certified that error appears in the above-identified patent and that said Letters Patent is hereby corrected as shown below:

Column 8, Line 22, delete "the a" and insert -- a --, therefor.

Column 9, Line 11, in Claim 8, delete "with" and insert -- within --, therefor.

Column 9, Line 32, in Claim 13, delete "wherein," and insert -- wherein --, therefor.

Column 10, Line 4, in Claim 14, after "samples", insert -- to a threshold value, the CPU indentifying a sequence of consecutive average samples --.

Signed and Sealed this
First Day of May, 2012

David J. Kappos
*Director of the United States Patent and Trademark Office*